US010787083B2

(12) United States Patent
Isotani et al.

(10) Patent No.: US 10,787,083 B2
(45) Date of Patent: Sep. 29, 2020

(54) VEHICLE HAVING A POWER LINE PROTECTION MEMBER

(71) Applicant: HONDA MOTOR CO., LTD., Tokyo (JP)

(72) Inventors: Seiji Isotani, Saitama (JP); Yuichiro Ueno, Saitama (JP); Kenta Watanabe, Saitama (JP); Hironobu Yamano, Tochigi (JP); Naoki Shibata, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/389,512

(22) Filed: Apr. 19, 2019

(65) Prior Publication Data

US 2019/0322182 A1 Oct. 24, 2019

(30) Foreign Application Priority Data

Apr. 20, 2018 (JP) .................................. 2018-081718

(51) Int. Cl.
| | |
|---|---|
| H02P 1/00 | (2006.01) |
| H02P 3/00 | (2006.01) |
| H02P 5/00 | (2016.01) |
| B60L 50/51 | (2019.01) |
| H02P 27/06 | (2006.01) |
| B60R 16/03 | (2006.01) |
| B60L 50/60 | (2019.01) |

(52) U.S. Cl.
CPC ............... *B60L 50/51* (2019.02); *B60L 50/60* (2019.02); *B60R 16/03* (2013.01); *H02P 27/06* (2013.01); *B60L 2210/40* (2013.01)

(58) Field of Classification Search
CPC ........... B60L 50/51; B60L 50/60; B60R 16/03
USPC ......................................................... 318/139
See application file for complete search history.

(56) References Cited

U.S. PATENT DOCUMENTS

| | | |
|---|---|---|
| 2004/0094340 A1 | 5/2004 | Kawasaki et al. |
| 2006/0121795 A1 | 6/2006 | Hashimura et al. |
| 2008/0173489 A1 | 7/2008 | Takasaki |
| 2008/0315572 A1 | 12/2008 | Hashimura et al. |
| 2011/0068622 A1 | 3/2011 | Ikeno et al. |

(Continued)

FOREIGN PATENT DOCUMENTS

| | | |
|---|---|---|
| JP | 2004-148850 A | 5/2004 |
| JP | 2004-161055 A | 6/2004 |

(Continued)

OTHER PUBLICATIONS

Dec. 10, 2019, Japanese Office Action issued for related JP Application No. 2018-081718.

*Primary Examiner* — Erick D Glass
(74) *Attorney, Agent, or Firm* — Paratus Law Group, PLLC (57) ABSTRACT

A vehicle includes an electric motor, a storage battery which supplies power to the electric motor, and a power line which configures a power transmission path between the electric motor and the storage battery. The power line is arranged to extend in a front-rear direction of the vehicle along a bottom surface of the vehicle. A part of the power line is covered by a protection member from below with a gap between the power line and the bottom surface. A fixing point of the protection member to the bottom surface is positioned on a front side of the protection member and on an outer side of the protection member in a vehicle width direction.

5 Claims, 9 Drawing Sheets (56) References Cited

U.S. PATENT DOCUMENTS

2013/0126254 A1 5/2013 Lee et al.
2013/0241282 A1 9/2013 Ikeno et al.

FOREIGN PATENT DOCUMENTS

| | | |
|---|---|---|
| JP | 2005-132348 A | 5/2005 |
| JP | 2008-162500 A | 7/2008 |
| JP | 2008-174031 A | 7/2008 |
| JP | 2011-025863 A | 2/2011 |
| JP | 2011-068187 A | 4/2011 |
| JP | 2013-060178 A | 4/2013 |
| JP | 2014-019379 A | 2/2014 |

VEHICLE HAVING A POWER LINE PROTECTION MEMBER

CROSS-REFERENCE TO RELATED APPLICATIONS

The present application claims the benefit of priority of Japanese Patent Application No. 2018-081718, filed on Apr. 20, 2018, the content of which is incorporated herein by reference.

TECHNICAL FIELD

The present invention relates to a vehicle, and particularly, to a vehicle in which a part of a power line arranged on a bottom surface of the vehicle is covered with a protection member.

BACKGROUND ART

There has been known a member that protects a power line, a cable or the like arranged on a bottom surface of a vehicle. For example, JP-A-2008-174031 discloses a bracket that protects an electric actuator for pulling a parking brake cable arranged on a bottom surface of a vehicle.

In recent years, vehicles such as hybrid vehicles and electric vehicles that include an electric motor and a storage battery which supplies power to the electric motor have been widespread, and it becomes more important for this type of vehicles to protect a power line arranged on a bottom surface of the vehicle from obstacles such as a curb.

However, the electric actuator for pulling the parking brake cable in JP-A-2008-174031 is fixed to a cross member by bolts on an upper surface thereof and is fixed to the vehicle body by adhesion to the bracket on a lower surface thereof. Therefore, when a curb or the like collides with the bracket, the electric actuator which is the protection object may fall off together with the bracket or may be damaged by being sandwiched between the bracket and a floor panel or the cross member.

SUMMARY

Accordingly, an aspect of the present invention provides a vehicle capable of appropriately protecting a power line from being damaged by a curb or the like.

According to an embodiment of the present invention, there is provided a vehicle including:
an electric motor;
a storage battery which is configured to supply power to the electric motor; and
a power line which configures a power transmission path between the electric motor and the storage battery,
wherein the power line is arranged to extend in a front-rear direction of the vehicle along a bottom surface of the vehicle,
wherein a part of the power line is covered by a protection member from below with a gap between the power line and the bottom surface, and
wherein a fixing point of the protection member to the bottom surface is positioned on a front side of the protection member and on an outer side of the protection member in a vehicle width direction.

According to the above configuration, the part of the power line arranged in the front-rear direction of the vehicle along the bottom surface of the vehicle is covered by the protection member, and the fixing point of the protection member is positioned on the front side of the protection member and on the outer side of the protection member in the vehicle width direction, so that even if the protection member collides with a curb when the vehicle turns, the protection member deforms to push up the power line. Accordingly, the power line can be appropriately protected from being damaged by a curb or the like.

DESCRIPTION OF EMBODIMENTS

Vehicles according to respective embodiments of the present invention will be described below with reference to the accompany drawings. In the drawings, the front side of the vehicle is denoted as Fr, the rear side is denoted as Rr, the left side is denoted as the right side is denoted as R, the upper side is denoted as U, and the lower side is denoted as D.

First Embodiment

First, a vehicle according to a first embodiment of the present invention will be described with reference to FIGS. 1 to 6.

Figure 1:
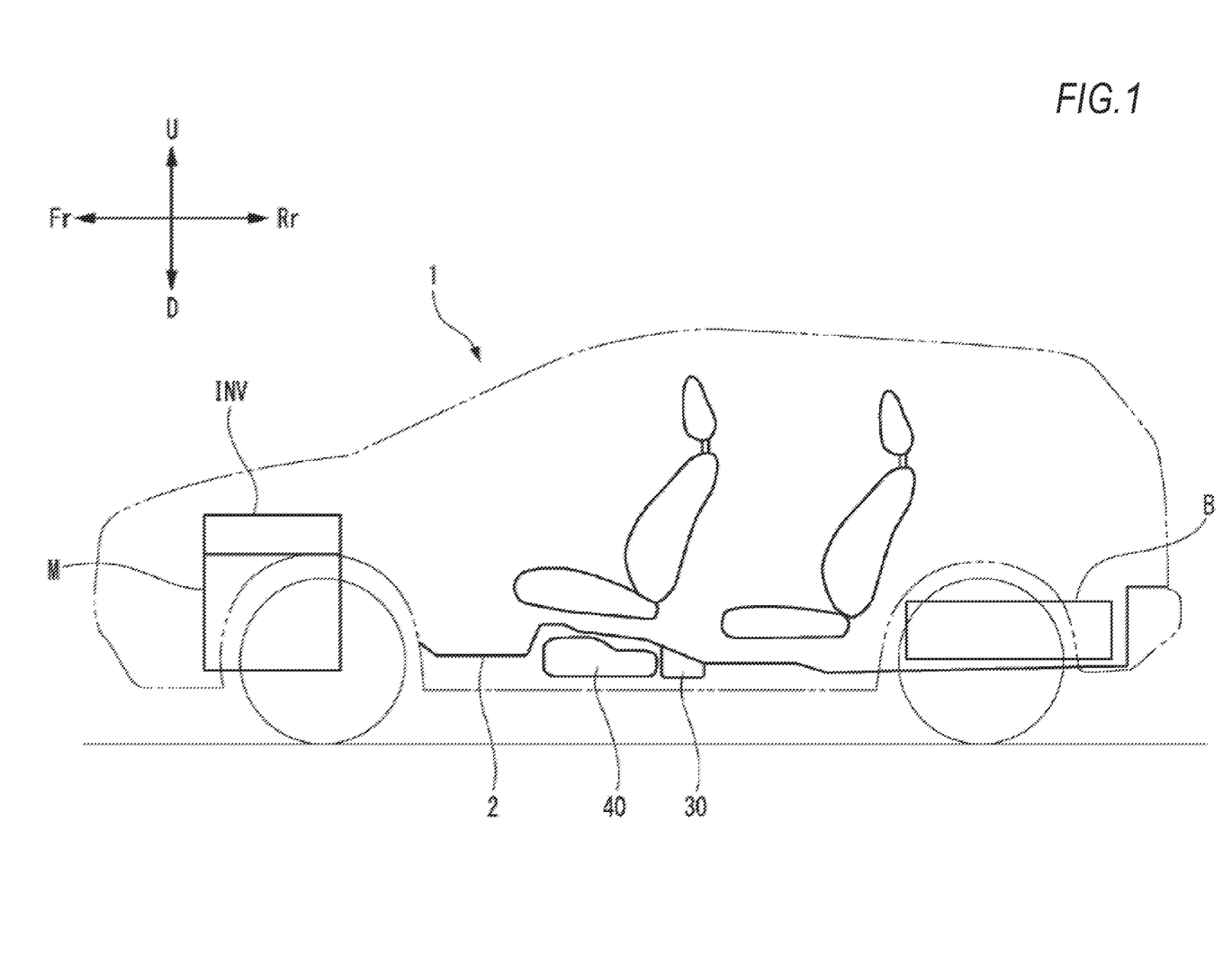
FIG. 1 is a schematic view of a vehicle according to a first embodiment of the present invention.

As shown in FIG. 1, a vehicle 1 according to the present embodiment includes an electric motor M and a power inverter INV both disposed in an electric motor room on a front side of the vehicle 1, a storage battery B disposed under a luggage compartment on a rear side of the vehicle 1, and a power line 10 connecting the storage battery B and the power inverter INV.

The storage battery B supplies power to the electric motor M. The power inverter INV is disposed on a power transmission path between the electric motor M and the storage battery B and is configured to step up a voltage of the power supplied from the storage battery B and convert the power from a direct current to an alternating current and to step down a voltage of power supplied from the electric motor M and convert the power from an alternating current to a direct current. The power line 10 is arranged to extend in a front-rear direction along a bottom surface 2 of the vehicle 1 and electrically connects the power inverter INV disposed on the front side of the vehicle 1 and the storage battery B disposed on the rear side of the vehicle 1.

Figure 2:
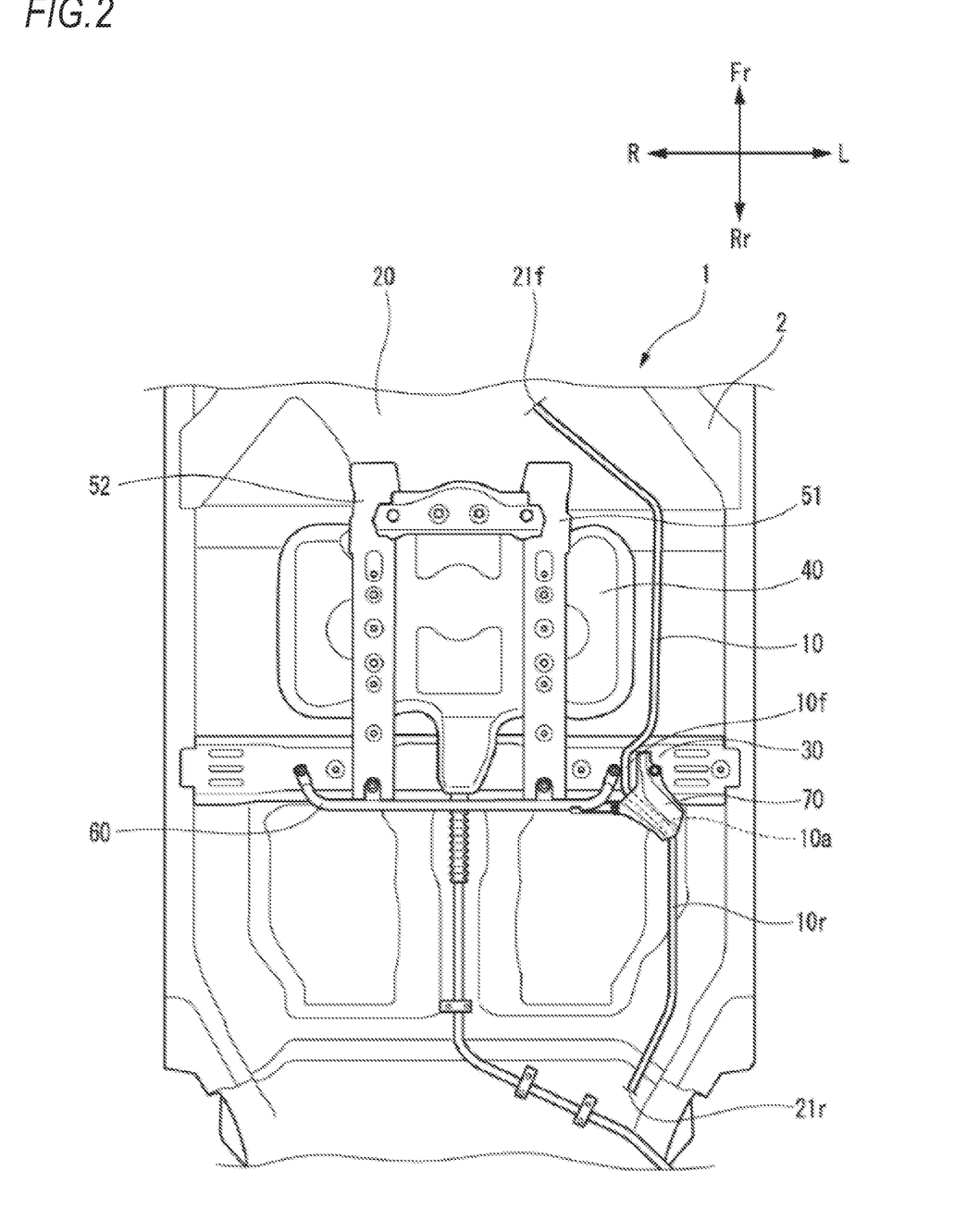
FIG. 2 is a view of the vehicle in FIG. 1 as seen from a bottom surface.

As shown in FIG. 2, one end of the power line 10 is connected to the power inverter INV disposed in the electric motor room on the front side of the vehicle 1, and the power line 10 passes through a front-side power line through hole 21f provided on the front side of a floor panel 20 so to be arranged under the floor panel 20. The power line 10 arranged under the floor panel 20 extends in the front-rear direction on a left side of the vehicle 1 and passes through a rear-side power line through hole 21r provided on the rear side of the floor panel 20, so that the other end of the power line 10 is connected to the storage battery B disposed above the floor panel 20 and on the rear side of the vehicle 1.

Here, a cross member 30 extending in a left-right direction (vehicle width direction) is provided under the floor panel 20 at a substantially center portion in the front-rear direction. The power line 10 arranged under the floor panel 20 extends in the front-rear direction across the cross member 30. The power line 10 has a bent portion 10a extending from a rear end of the cross member 30 to a left end side which is an outer side in the vehicle width direction of the vehicle 1, a front straight portion 10f extending forward from a front end of the bent portion 10a in a direction substantially parallel to the front-rear direction of the vehicle 1, and a rear straight portion 10r extending rearward from a rear end of the bent portion 10a in a direction substantially parallel to the front-rear direction of the vehicle 1.

A fuel tank 40 is provided under the floor panel 20 on the front side than the cross member 30. The fuel tank 40 extends in the front-rear direction of the vehicle 1 and is supported from below by two fuel tank supporting members 51, 52 whose front ends are fixed to the floor panel 20 and whose rear ends are fixed to the cross member 30. A fuel tank guard 60 extending in the left-right direction is provided on the rear side of the fuel tank 40. The fuel tank guard 60 is fixed to the two fuel tank supporting members 51, 52 and is fixed to the cross member 30 on the further outer side in the vehicle width direction.

Here, since the power line 10 is arranged to extend in the front-rear direction on the left side of the vehicle 1 under the floor panel 20, the power line 10 may collide with a curb when the vehicle is turning left. Therefore, a protection member 70 that covers the power line 10 from below is provided to protect the power line 10 in a turning-influence area A which is influenced when the vehicle 1 turns left.

Figure 3:
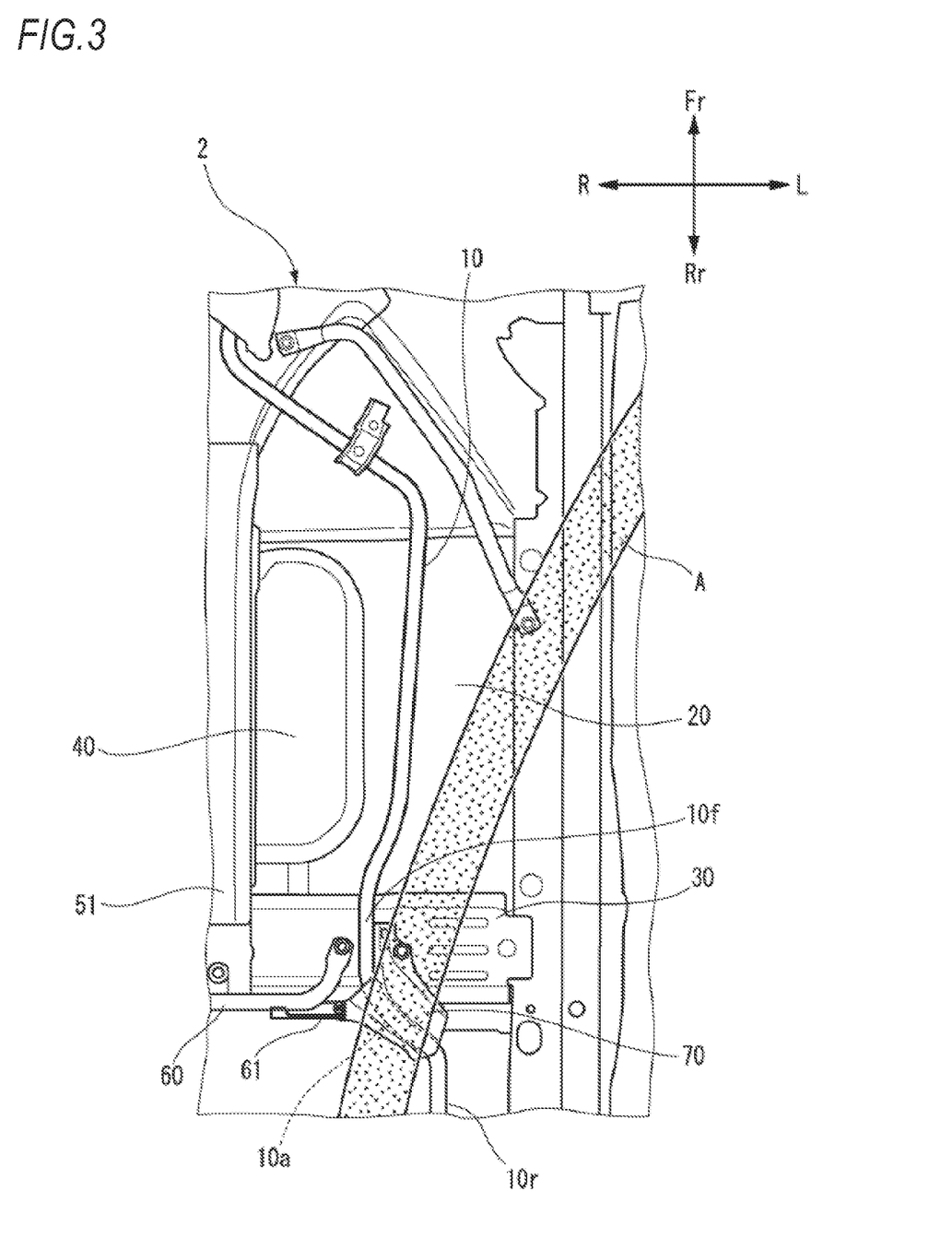
FIG. 3 is an enlarged view of the bottom surface on a left side of the vehicle in FIG. 1.

Specifically, as shown in FIG. 3, the front straight portion 10f is arranged on an inner side than the turning-influence area A in the vehicle width direction. Further, the rear straight portion 10r is arranged on the outer side than the turning-influence area A in the vehicle width direction. Further, the bent portion 10a is arranged to cross the turning-influence area A. That is, the protection member 70 is provided so as to cover the bent portion 10a crossing the turning-influence area A from below.

Figure 4:
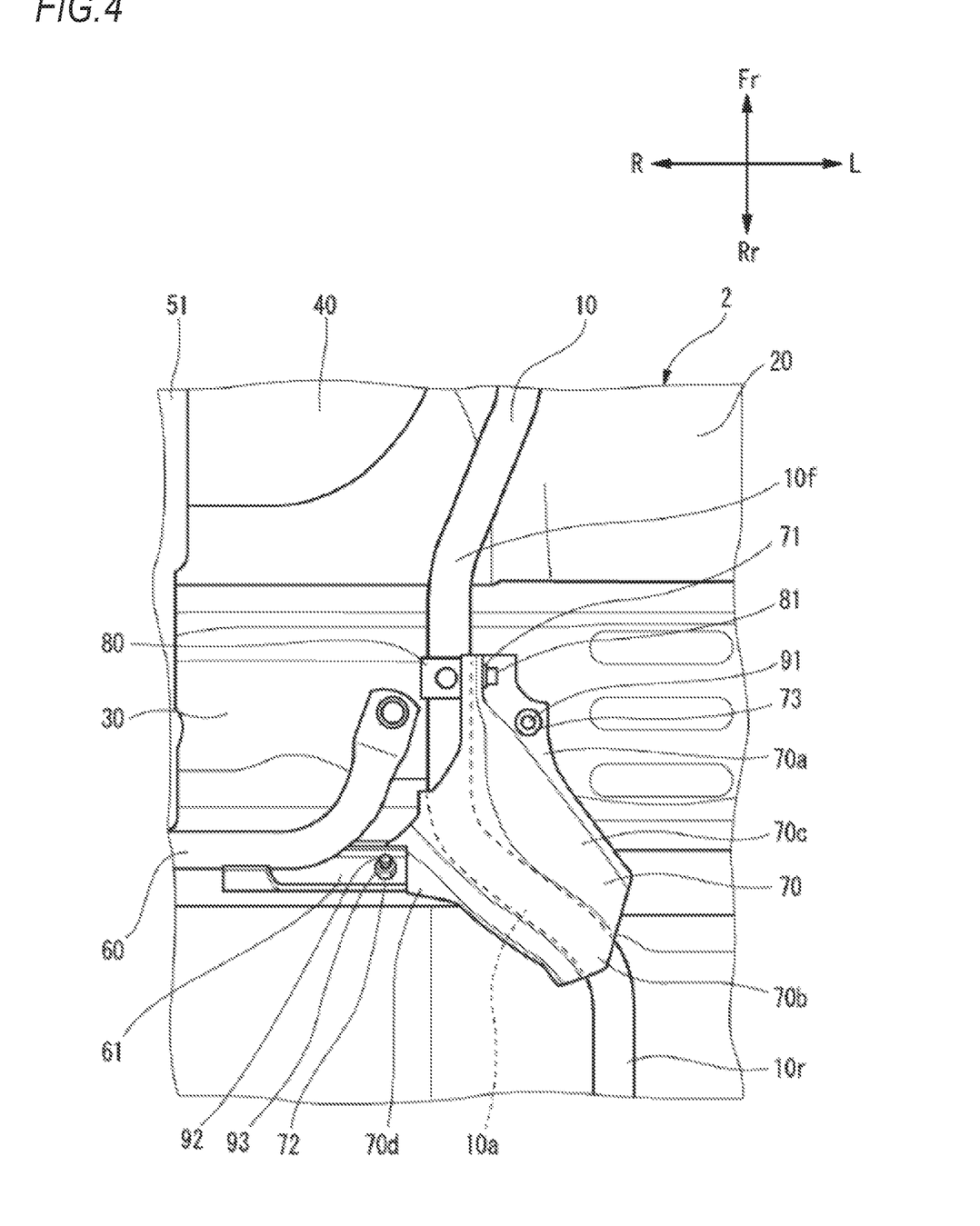
FIG. 4 is an enlarged view around a protection member of the vehicle in FIG. 1.
Figure 5A:
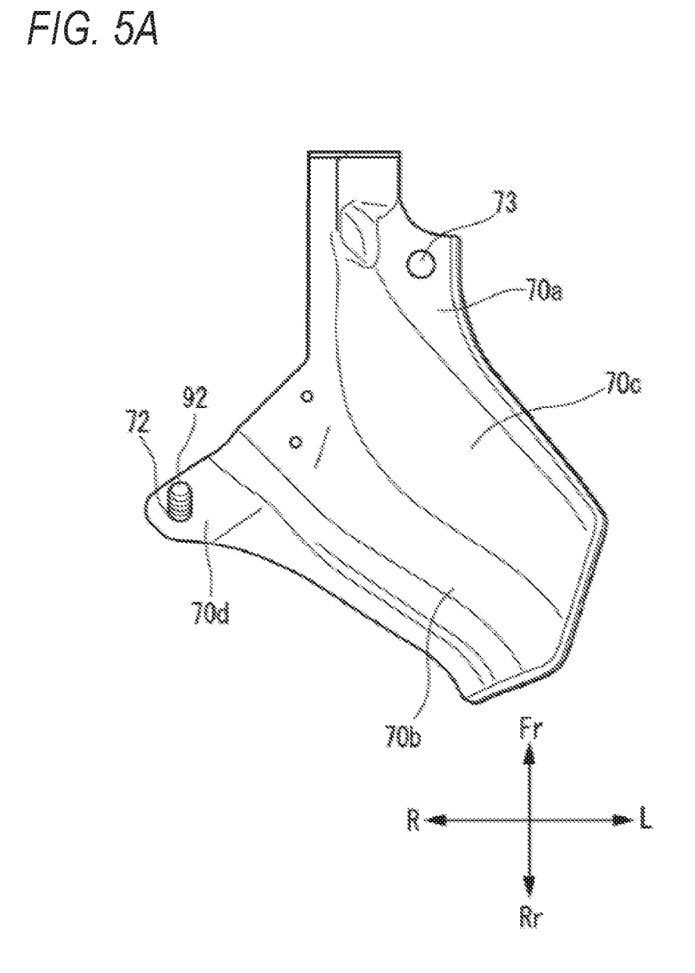
FIG. 5A is a plan view of the protection member.
Figure 5B:
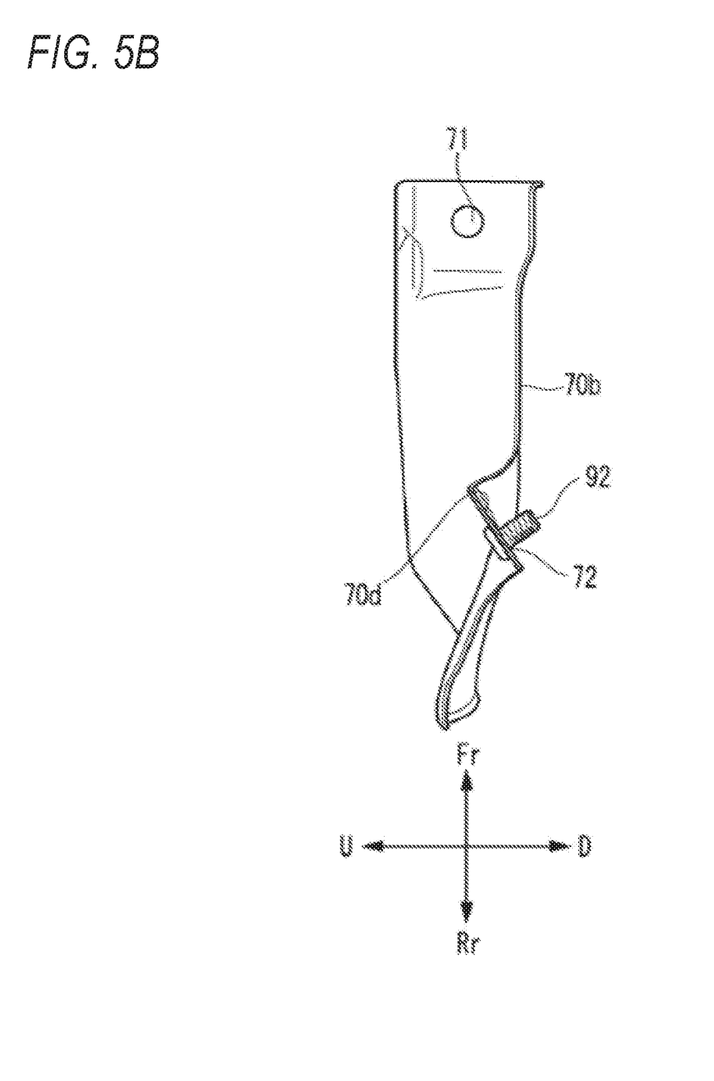
FIG. 5B is a side view of the protection member as seen from a right side.
Figure 5C:
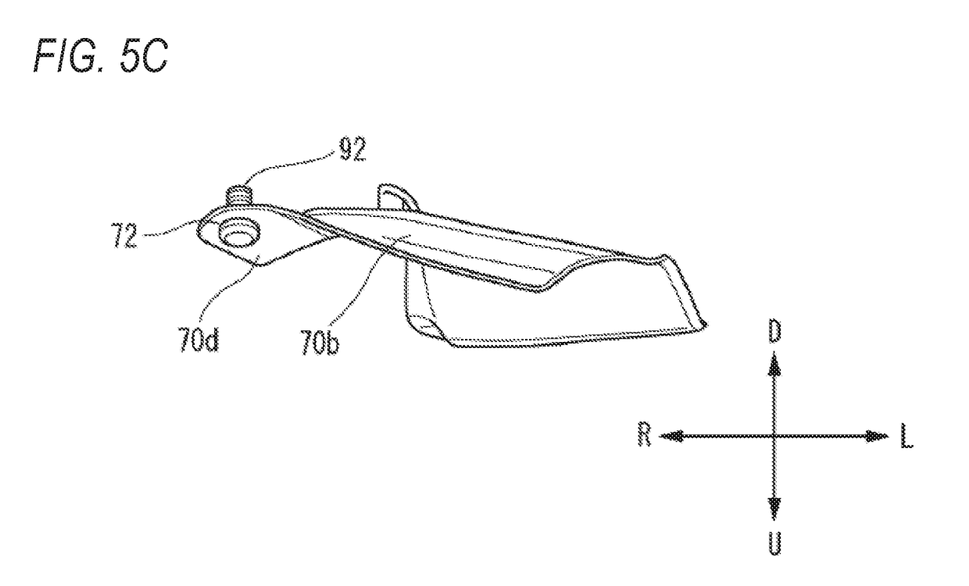
FIG. 5C is a side view of the protection member as seen from a rear side.

As shown in FIG. 4, the front straight portion 10f is fixed to a bottom surface of the cross member 30 by a power line clamp 8C) fixed to the cross member 30. The protection member 70 covers the bent portion 10a from below, and a first engagement portion 71 provided at a front end portion of the protection member 70 is engaged with a first engagement pin 81 extending from the power line clamp 80 to the outer side in the vehicle width direction of the vehicle 1. The protection member 70 is fixed to the cross member 30 by a fixing bolt 91 at a fixing point 73 provided on the front side than the bent portion 10a and on the outer side than the power line 10 in the vehicle width direction. Further, a second engagement portion 72 of the protection member 70 provided on an inner side than the power line 10 in the vehicle width direction is engaged with a guard extension portion 61 extending from the fuel tank guard 60 to the outer side in the vehicle width direction by a second engagement bolt 92 and a second engagement nut 93.

As described above, the front straight portion 10f side of the bent portion 10a, that is, a front end side of the protection member 70 is fixed to the cross member 30. The rear straight portion 10r side of the bent portion 10a, that is, a rear end side of the protection member 70 is a free end. In other words, in the protection member 70, one side in a longitudinal direction is directly or indirectly fixed to the bottom surface 2 of the vehicle 1 at the fixing point 73 and the second engagement portion 72, and the other side in the longitudinal direction is a free end while being separated from the bottom surface 2 of the vehicle 1.

As shown in FIG. 4 and FIGS. 5A to 5C, the protection member 70 is in contact with the cross member 30 and has a cross member contact surface 70a on which the fixing point 73 is provided, a power line insertion surface 70b disposed on the lower side of the cross member contact surface 70a and through which the power line 10 is inserted on the upper side thereof, an inclined surface 70c inclined downward from the cross member contact surface 70a toward the power line insertion surface 70b, and a fuel tank guard contact surface 70d in contact with the guard extension portion 61 of the fuel tank guard 60 and on which the second engagement portion 72 is provided. The power line insertion surface 70b extends along the bent portion 10a of the power line 10, and the cross member contact surface 70a extends substantially in parallel with the power line insertion surface 70b. That is, the inclined surface 70c is a surface inclined downward from the cross member contact surface 70a toward the power line insertion surface 70b substantially in parallel with the bent portion 10a of the power line 10.

Figure 6:
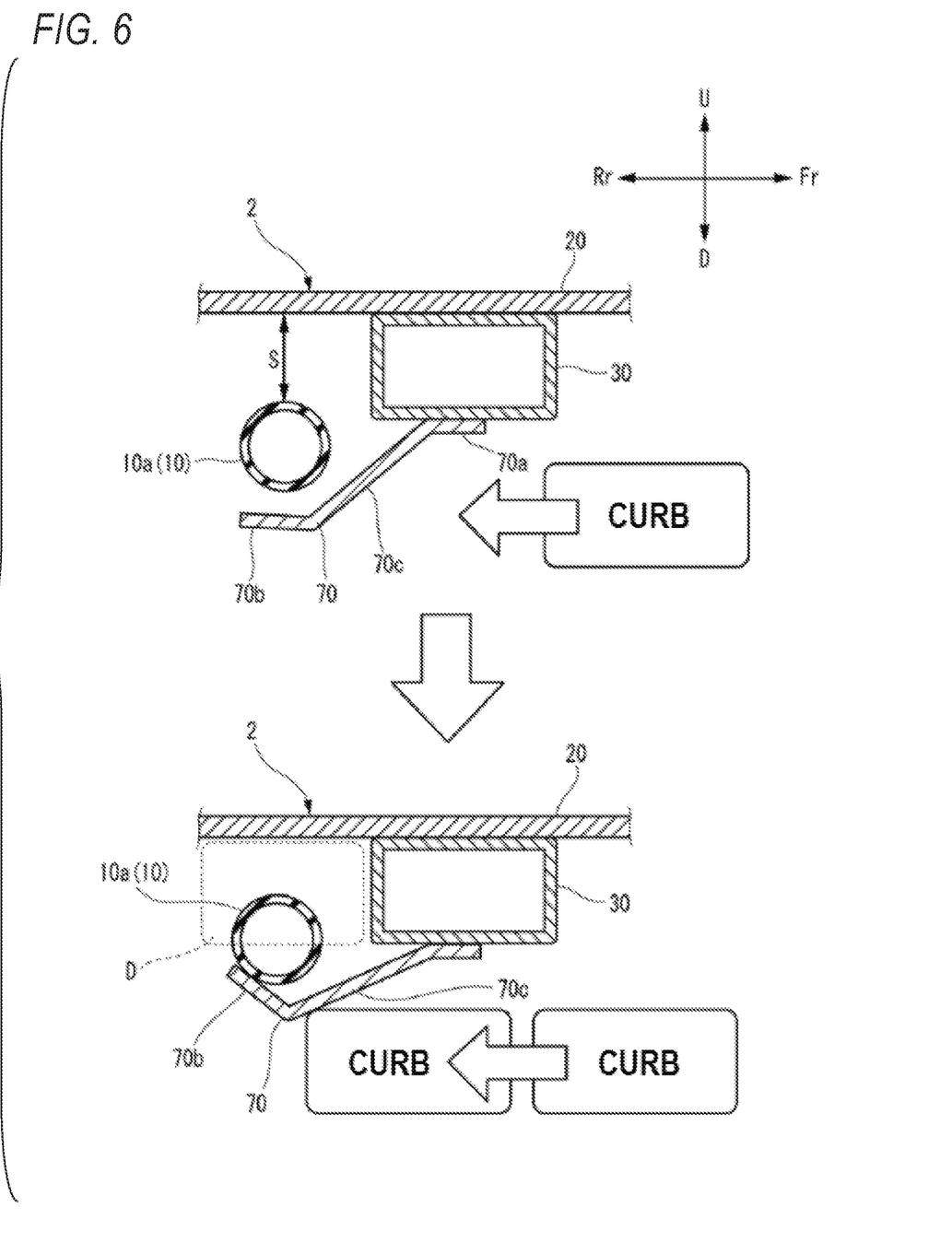
FIG. 6 is a schematic view for illustrating deformation of the protection member when the vehicle in FIG. 1 collides with a curb.

As shown in FIG. 6, a gap S is provided between the bent portion 10a of the power line 10 and the floor panel 20 in an upper-lower direction, and a dead space D defined by the floor panel 20 and the cross member 30 is formed on the rear side of the cross member 30 at the bottom surface 2 of the vehicle 1.

When the vehicle 1 turns left, in a case where a curb intrudes from a left front side of the vehicle 1 under the floor panel 20, the curb collides with the inclined surface 70c of the protection member 70. Here, the fixing point 73 of the protection member 70 is positioned on the front side than the bent portion 10a of the power line 10 and on the outer side thereof in the vehicle width direction, so that as the curb intrudes toward the rear side of the vehicle, the protection member 70 is deformed such that the power line insertion surface 70b is pushed toward the upper side of the vehicle along the inclination of the inclined surface 70c of the protection member 70 with the fixing point 73 as a fulcrum. The power line insertion surface 70b is pushed toward the upper side of the vehicle, so that the bent portion 10a of the power line 10 is pushed up to the dead space D.

Accordingly, the power line 10 does not come into direct contact with the curb, so as to be appropriately protected from damage. Further, the protection member 70 is deformed such that the power line 10 is pushed to the upper side of the vehicle with the fixing point 73 fixed to the cross member 30 as the fulcrum, so that the power line 10 can be retracted to the dead space D, and the power line 10 can be prevented from being pushed to the rear side of the vehicle by the curb and being damaged. Further, the fixing point 73 of the protection member 70 is positioned on the front side than the bent portion 10a of the power line 10, so that a deformation direction of the protection member 70 is along an intrusion direction of the curb so as to more reliably protect the power line 10.

The second engagement portion 72 of the protection member 70 provided on the inner side than the power line 10 in the vehicle width direction is engaged with the guard extension portion 61 extending from the fuel tank guard 60 to the outer side in the vehicle width direction by the second engagement bolt 92 and the second engagement nut 93. Therefore, it is possible to reduce the vibration of the protection member 70 due to the vibration of the vehicle 1.

Second Embodiment

Next, a vehicle according to a second embodiment of the present invention will be described with reference to FIG. 7. In the following description, constituent elements identical or similar to those of the vehicle of the first embodiment are denoted by the same reference numerals, and the explanation thereof is omitted or simplified.

In the vehicle according to the first embodiment, the protection member 70 is fixed to the cross member 30 by the fixing bolt 91 at the fixing point 73 provided on the front side than the bent portion 10a and on the outer side than the power line 10 in the vehicle width direction, whereas in the vehicle according to the second embodiment, a protection member 700 is fixed to the floor panel 20 on the front side than the bent portion 10a and on the outer side than the power line 10 in the vehicle width direction.

Figure 7:
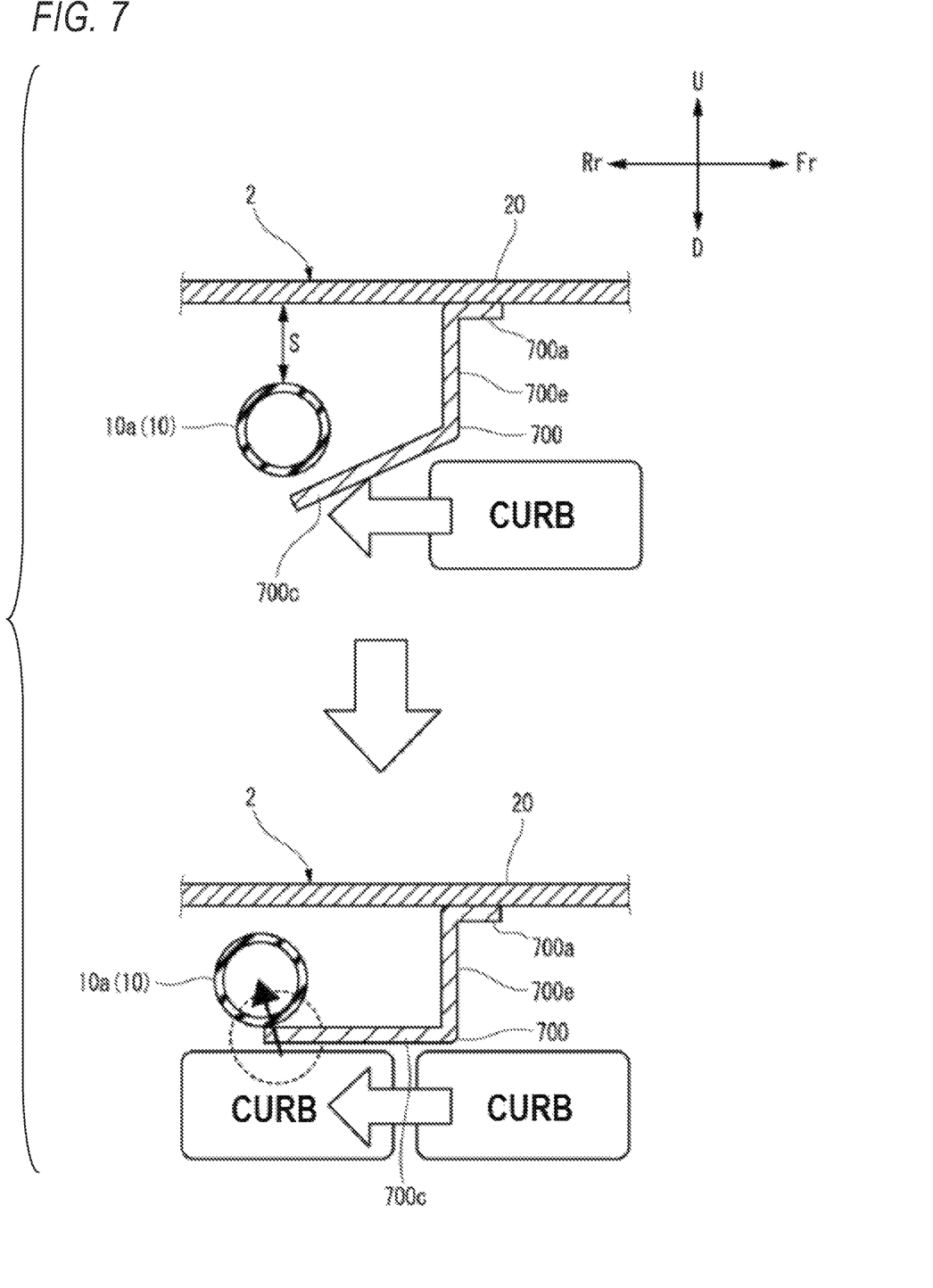
FIG. 7 is a schematic view for illustrating deformation of a protection member when a vehicle according to a second embodiment of the present invention collides with a curb.

As shown in FIG. 7, the protection member 700 has a floor panel contact surface 700a which is in contact with the floor panel 20 on the front side than the bent portion 10a and on the outer side than the power line 10 in the vehicle width direction, a vertical surface 700e extending toward the lower side of the vehicle from a rear end of the floor panel contact surface 700a, and an inclined surface 700c inclined downward from a lower end of the vertical surface 700e toward the rear side of the vehicle.

The protection member 700 is fixed to the floor panel 20 at the floor panel contact surface 700a on the front side than the bent portion 10a and on the outer side than the power line 10 in the vehicle width direction. A length of the vertical surface 700e in the upper-lower direction is longer than a diameter of the power line 10. The inclined surface 700c is arranged to overlap the bent portion 10a of the power line 10 in a horizontal direction.

As described above, the front straight portion 10f side of the bent portion 10a, that is, a front end side of the protection member 700 is fixed to the floor panel 20. The rear straight portion 10r side of the bent portion 10a, that is, a rear end side of the protection member 70 is a free end.

A gap S is provided between the bent portion 10a of the power line 10 and the floor panel 20 in the upper-lower direction.

When the vehicle 1 turns left, in a case where a curb intrudes from a left front side of the vehicle 1 under the floor panel 20, the curb collides with the inclined surface 700c of the protection member 700. The protection member 700 is fixed to the floor panel 20 on the front side than the bent portion 10a of the power line 10 and on the outer side thereof in the vehicle width direction, so that as the curb intrudes toward the rear side of the vehicle, the protection member 700 is deformed such that a vehicle rear end side of the inclined surface 700c is pushed toward the upper side. When the vehicle rear end side of the inclined surface 700c is pushed toward the upper side, the vehicle rear end side of the inclined surface 700c comes into contact with the bent portion of the power line 10 overlapped in the horizontal direction, so as to push the bent portion 10a of the power line 10 toward the upper side.

Accordingly, the curb passes through under the inclined surface 700c, and the power line 10 does not come into direct contact with the curb, so that the power line 10 can be appropriately protected from being damaged. Further, the length of the vertical surface 700e in the upper-lower direction is longer than a diameter of the power line 10, and the gap S is provided between the bent portion 10a of the power line 10 and the floor panel 20 in the upper-lower direction, so that due to the deformation of the vehicle rear end side of the inclined surface 700c being pushed toward the upper side, the power line 10 can be retracted to a space defined by the floor panel 20, the vertical surface 700e and the inclined surface 700c, and the power line 10 can be prevented from being pushed to the rear side of the vehicle by the curb and being damaged.

The above-described embodiments may be appropriately modified, improved, or the like. For example, in the first embodiment and the second embodiment, the power line 10 connects the storage battery B and the power inverter INV. However, the power line 10 may be a three-phase line that connects the electric motor M and the power inverter INV. In this case, the three-phase line that connects the electric motor M and the power inverter INV can be prevented from being damaged by a curb or the like.

In the first embodiment, the bent portion 10a of the power line 10 is disposed on the rear side of the cross member 30. However, the bent portion 10a is not limited to be disposed on the rear side of the cross member 30 but may be disposed at any position where a gap S is provided between the bent portion 10a and the floor panel 20 in the upper-lower direction. In this case, the protection member 70 can be disposed at a position where a curb or the like more easily intrudes under the floor panel 20 when steering the vehicle 1, and the power line 10 can be more reliably protected.

In the meantime, at least the following subject matters are described in this specification. Although the corresponding constituent elements or the like in the above-described embodiments are shown in parentheses, the present invention is not limited thereto.

(1) A vehicle (vehicle 1) includes:
an electric motor (electric motor M);
a storage battery (storage battery B) which is configured to supply power to the electric motor; and
a power line (power line 10) which configures a power transmission path between the electric motor and the storage battery,
wherein the power line is arranged to extend in a front-rear direction of the vehicle along a bottom surface (bottom surface 2) of the vehicle,
wherein a part of the power line is covered by a protection member (protection member 70) from below with a gap (gap S) between the power line and the bottom surface, and
wherein a fixing point (fixing point 73) of the protection member to the bottom surface is positioned on a front side of the protection member and on an outer side of the protection member in a vehicle width direction.

According to (1), the part of the power line arranged in the front-rear direction of the vehicle along the bottom surface of the vehicle is covered by the protection member, and the fixing point of the protection member is positioned on the front side of the protection member and on the outer side of the protection member in the vehicle width direction, so that even if the protection member collides with a curb when the vehicle turns, the protection member deforms to push up the power line. Accordingly, the power line can be appropriately protected from being damaged by a curb or the like.

(2) In the vehicle according to (1),
the protection member is engaged with another member (guard extension portion 61) attached to the bottom surface on an inner side than the power line in the vehicle width direction.

According to (2), the protection member is engaged with another member attached to the bottom surface on the inner side than the power line in the vehicle width direction, so that the vibration of the protection member due to the vibration of the vehicle can be reduced. When the protection member collides with a curb, the hindering of the deformation of the protection member can be prevented.

(3) In the vehicle according to (1) or (2),
the power line is disposed across a cross member (cross member 30),
the fixing point of the protection member is positioned on the cross member, and
a rear end portion of the protection member is a free end.

According to (3), when the protection member collides with a curb, the protection member deforms with the fixing point fixed to the cross member as the fulcrum, so that the power line can be retracted to a dead space defined by the cross member and the bottom surface.

(4) In the vehicle according to any one of (1) to (3),
the power line includes:
a bent portion (bent portion 10a) bent onward the outer side in the vehicle width direction;
a front straight portion (front straight portion 10f) positioned on a front side of the bent portion and extending in a direction substantially parallel to the front-rear direction of the vehicle; and
a rear straight portion (rear straight portion 10r) positioned on a rear side of the bent portion and extending in a direction substantially parallel to the front-rear direction of the vehicle; and
the fixing point of the protection member is positioned on the front side of the bent portion.

According to (4), the fixing point of the protection member is positioned on the front side of the bent portion, so that a deformation direction of the protection member is along an intrusion direction of a curb so as to more reliably protect the power line.

(5) In the vehicle according to any one of (1) to (4),
the vehicle includes a power inverter (power inverter INV) which is disposed on the power transmission path between the electric motor and the storage battery and is configured to convert power, and
the power line connects the storage battery and the power inverter.

According to (5), the power line that connects the electric motor and the power inverter can be prevented from being damaged by a curb or the like.

The invention claimed is:
1. A vehicle comprising:
an electric motor;
a storage battery which is configured to supply power to the electric motor; and
a power line which configures a power transmission path between the electric motor and the storage battery,
wherein the power line is arranged to extend in a front-rear direction of the vehicle along a bottom surface of the vehicle,
wherein a part of the power line is covered by a protection member from below with a gap between the power line and the bottom surface,
wherein a fixing point of the protection member to the bottom surface is positioned on a front side of the protection member and on an outer side of the protection member in a vehicle width direction,
wherein the power line is disposed across a cross member,
wherein the fixing point of the protection member is positioned on the cross member, and
wherein a rear end portion of the protection member is a free end.

2. The vehicle according to claim 1,
wherein the protection member is engaged with another member attached to the bottom surface on an inner side than the power line in the vehicle width direction.

3. The vehicle according to claim 1, further comprising:
a power inverter which is disposed on the power transmission path between the electric motor and the storage battery and is configured to convert power,
wherein the power line connects the storage battery and the power inverter.

4. The vehicle according to claim 1, wherein the protection member is deformed such that the power line is pushed up to a space facing the cross member and the bottom surface upon receiving external force.

5. A vehicle comprising:
an electric motor;
a storage battery which is configured to supply power to the electric motor; and
a power line which configures a power transmission path between the electric motor and the storage battery,
wherein the power line is arranged to extend in a front-rear direction of the vehicle along a bottom surface of the vehicle,
wherein a part of the power line is covered by a protection member from below with a gap between the power line and the bottom surface,
wherein a fixing point of the protection member to the bottom surface is positioned on a front side of the protection member and on an outer side of the protection member in a vehicle width direction,
wherein the power line includes:
a bent portion bent toward the outer side in the vehicle width direction;
a front straight portion positioned on a front side of the bent portion and extending in a direction substantially parallel to the front-rear direction of the vehicle; and
a rear straight portion positioned on a rear side of the bent portion and extending in a direction substantially parallel to the front-rear direction of the vehicle, and
wherein the fixing point of the protection member is positioned on the front side of the bent portion.

* * * * *